UNITED STATES PATENT OFFICE.

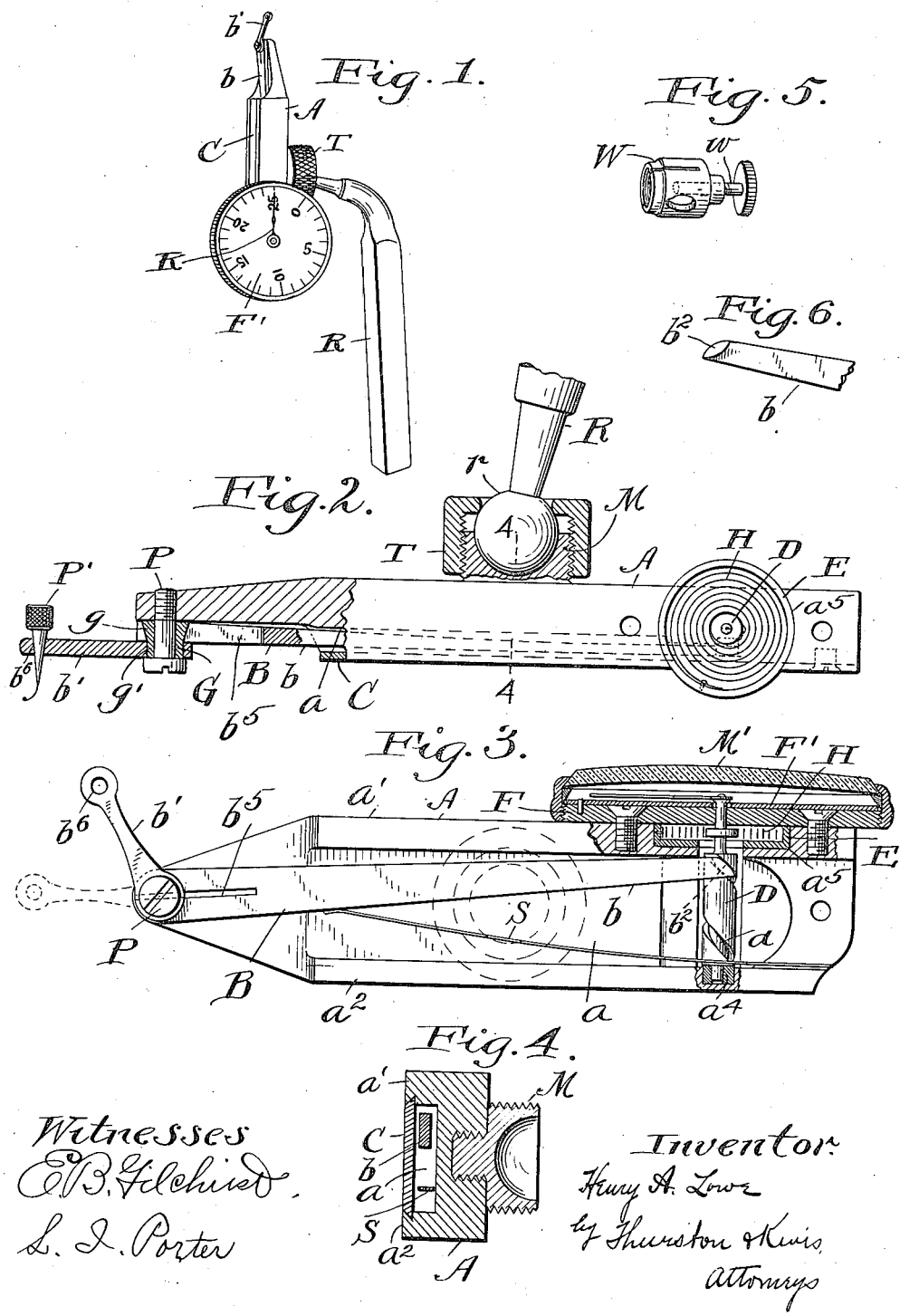

HENRY A. LOWE, OF CLEVELAND, OHIO.

TEST-INDICATOR.

1,144,367.

Specification of Letters Patent.

Patented June 29, 1915.

Application filed June 25, 1914. Serial No. 847,189.

*To all whom it may concern:*

Be it known that I, HENRY A. LOWE, a citizen of the United States, residing at Cleveland, in the county of Cuyahoga and State of Ohio, have invented a certain new and useful Improvement in Test-Indicators, of which the following is a full, clear, and exact description.

The object of this invention is to provide a universally adaptable instrument for testing the trueness of various kinds of surfaces, and for indicating plainly where and how much any surface is out of true.

The invention consists in the construction and combination of parts shown in the drawing and hereinafter described and definitely pointed out in the appended claims.

In the drawing, Figure 1 is a perspective view of the device in condition for attachment to the tool post of a machine tool, in such position that it may engage and test the surface of any article secured in said machine tool. Fig. 2 is a magnified plan, partly sectioned, of the instrument when the dial and parts associated therewith have been removed. Fig. 3 is a magnified front elevation of the instrument when the cover plate C has been removed, and when the dial and associated parts are sectioned. Fig. 4 is a sectional view in the plane of line 4—4 on Fig. 2 when the tool post shank has been disconnected from the instrument. Fig. 5 is a detached perspective view of an attachment adapted to be secured to the instrument to facilitate its connection with the needle of a surface gage. Fig. 6 is a rear view of the end of the lever arm $b$.

Referring to the parts by letters, A represents the body plate of the device. In what may be termed the front face of this plate is a recess $a$ which is closed at the end adjacent the dial and is open at the other end. This recess lies between the forwardly projecting flanges $a^1$, $a^2$ formed along the upper and lower edges of the body plate. A sliding cover C is fitted in dove tailed grooves in these flanges and is adapted to protect the operating parts within said recess (see Fig. 4).

A lever B is pivoted to the front face of the body plate. Its long arm $b$ extends into said recess $a$, and is provided on its rear face with a tooth $b^2$ which projects into a spiral groove $d$ in the spindle D, and is held by the spring action to be described in contact with the lower wall of said spiral groove. This spindle is mounted on its lower end in a bearing $a^4$ in the bottom flange $a^2$ of the body plate, and extends upwardly therefrom,—its upper end being rotatably mounted in a metallic dial plate F secured to the upper face of the body plate. A thin graduated dial plate $F^1$ is accurately fixed to the outer face of the metallic dial plate F. A pointer K is secured to the upper projecting end of the spindle and normally occupies a position just back of the zero graduation,—in which position it is stopped by the engagement of lever arm $b$ with the flange $a^1$ of the body plate.

A fine spiral spring H lies in a spring barrel E, and is fixed at one end to said spring barrel and at the other end to the spindle. The spring barrel E is in the form of a circular cup which fits friction tight in a socket $a^5$ formed in the upper surface of the body plate. The tension of the spring H may be varied, as desired, by turning this spring barrel relative to the spindle until the required tension is put upon the spring,—after which the spring barrel is forced into the socket in the body plate, and the dial plate F is secured to the body plate over the open upper end of the spring barrel. This spring acts on the spindle to turn it backward as far as it may go.

The short arm $b^1$ of the lever B projects beyond the body plate, so that it may be brought into engagement with that surface which is to be tested. Since the surfaces to be tested may occupy a great variety of positions relative to the support for the instrument, this short arm is made capable of adjustment to bring it into many positions relative to the long arm. To accomplish this adjustment the short lever arm and the long lever arm are made separately. The long lever arm has through it a tapered hole for the reception of the tapered part $g$ of the bushing G. Likewise the lever arm $b$ is slitted from its outer end inward, the slit $b^5$ intersecting the said hole and forming two arms which spring inward and grip the bushing friction tight, so that in the ordinary use of the instrument the lever arm $b$ must move with the bushing. The bushing is tubular and is pivoted to the body plate A by means of the screw P. The bushing has a cylindrical part $g^1$ on which the short arm of the lever is tightly fitted so that it is rigidly secured thereto, and must always turn with the bushing. If, now, one wishes to adjust the position of the short lever arm $b^1$ with respect to the long arm $b$, he takes hold of both and turns the short lever arm into the desired position. As this lever arm so moves, the bushing G turns in the long lever arm $b$.

A flat spring S secured to the body plate lies in the recess $a$, and engages the long arm $b$ of the lever B and acts to move it backward,—that is to say, upward and in the direction which it must move when the pointer is moving backward.

The two arms $b$, $b^1$ of the lever B are so proportioned relative to one another, and the spiral groove $d$ is so constructed that for any movement of the outer end of the arm $b^1$ there will be a corresponding movement of the pointer K one-hundred times as great. As shown, the dial is graduated from zero to 25, and each of these graduations represents a deflection of one thousandth of an inch of the short arm of the lever B.

There are some possible uses of the instrument, such, for example, as measuring the out-of-trueness of small holes, which require a device for engaging the surface of the holes smaller than the outer end of the short arm $b$. In order that this may be provided, there is a tapered hole $b^6$ formed in the outer end of said lever arm for the purpose of receiving the tapered shank of a wire $P^1$ which may thereby be secured in said hole. In that event, the outer end of this wire bent into the required position will be the part of the device engaging with the surfaces to be tested.

On the rear side of the body plate is an externally threaded boss M which has a hemi-spherical recess in its end. R represents a tool post shank,—that is to say, a shank adapted to be secured in the tool post of a machine tool, and this has a spherical end $r$ which may be clamped in the spherical socket in the boss M, and in any desired position therein by means of a clamping nut T. If it is desired to use the device in connection with a so-called surface gage, a clamping device W may be screwed upon the threaded boss M, and this clamping device is adapted to be fastened upon the needle of the surface gage by means of the screw $w$.

Having described my invention, I claim:

1. In a test indicator, the combination of a body plate having a recess in one face, and having on its opposite face a projecting threaded boss for connecting it with a suitable support, a removable cover plate for closing the front side of said recess, a spindle mounted on the body plate and lying partly within said recess and being provided with a spiral groove, a lever pivoted to said body plate and having one short arm which projects beyond the body plate and is adapted for contact with a surface to be tested and having a long arm which projects into said recess and is provided with a projection which engages in said spiral groove, a spring exerting its force to turn the spindle backward, and a dial and pointer secured the one to said body plate and the other to said spindle.

2. In a test indicator, the combination of a body plate, a spindle mounted thereon and provided with a spiral groove, a dial and pointer secured the one to said body plate and the other to said spindle, a lever pivoted to said body plate,—said lever having two arms, which are adjustably connected, one adapted for contact with a surface to be tested, and the other provided with a projection which engages in said spiral groove, a light spiral spring acting on the spindle to turn it backward, and a second spring acting upon the lever to swing it backward.

3. In a test indicator, the combination of a body plate, a spindle mounted thereon and provided with a spiral groove, a dial and pointer secured the one to said body plate and the other to said spindle, a lever pivoted to said body plate,—said lever having two arms, one adapted for contact with the surface to be tested and one having a projection which engages in said spiral groove, a spring barrel through which said spindle passes, a light spiral spring in said spring barrel secured at one end thereto and at its other end to said spindle,—said body plate having a recess in which said spring barrel is adjustably secured.

4. In a test indicator, the combination of a body plate, a spindle mounted thereon and provided with a spiral groove, a dial and pointer secured the one to said body plate and the other to said spindle, a lever pivoted to said body plate,—said lever having two arms one adapted for contact with a surface to be tested, and one having a projection which engages in said spiral groove, a spring barrel through which said spindle passes, a light spiral spring in said spring barrel secured at one end therto and at its other end to the spindle, said body plate having a recess in which the spring barrel fits with sufficient friction to prevent its turning therein.

5. In a test indicator, the combination of a body plate, a spindle mounted thereon and provided with a spiral groove, a lever pivoted to said body plate, said lever having two arms, one adapted for contact with a surface to be tested, and the other arm having a projection which engages in said spiral groove, a spring barrel through which said spindle passes, a light spiral spring in said spring barrel secured at one end thereto and at its other end to the spindle, said body plate having a recess in which the spring barrel fits with sufficient friction to prevent its turning therein, a dial plate fixed to said body plate and extended over said spring barrel, and a pointer secured to the end of said spindle over said dial.

6. In a test indicator, the combination of a body plate, a spindle mounted thereon and provided with a spiral groove, a dial and pointer secured the one to said body plate and the other to said spindle, a lever pivoted to said body plate,—one arm of which is adapted for contact with a surface to be tested, and the other arm is provided with a projection which engages said spiral groove, and a spring exerting its force to turn the spindle backward, that lever arm which engages with the spindle having near its opposite end a hole through it and being split from its end across said hole, a bushing having a portion which is frictionally clamped in the hole in said lever arm, and having a portion upon which the other arm of the lever is immovably secured, and a pivoting screw passing through said bushing and screwing into the body plate.

7. In a test indicator, the combination of a spindle mounted thereon and provided with a spiral groove, a dial and pointer secured the one to said body plate and the other to said spindle, a lever pivoted to said body plate, one arm of which is provided with a projection which engages said spiral groove and the other of which is provided with a tapered hole for the reception of an extension arm, a spiral spring exerting its force to turn the spindle backward, and a leaf spring engaging said lever and exerting its force against said lever in a direction to return the lever to its normal position.

In testimony whereof, I hereunto affix my signature in the presence of two witnesses.

HENRY A. LOWE. [L. S.]

Witnesses:
E. L. THURSTON,
L. I. PORTER.